(12) United States Patent
Hofer et al.

(10) Patent No.: US 8,608,886 B2
(45) Date of Patent: Dec. 17, 2013

(54) METHOD FOR CONNECTING A FIRST COMPONENT TO A SECOND COMPONENT

(75) Inventors: Bernhard Hofer, Graz (AT); Wolfgang Passegger, Tillmitsch (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 13/621,032

(22) Filed: Sep. 15, 2012

(65) Prior Publication Data

US 2013/0098536 A1 Apr. 25, 2013

Related U.S. Application Data

(60) Provisional application No. 61/536,277, filed on Sep. 19, 2011.

(30) Foreign Application Priority Data

Dec. 16, 2011 (EP) .................................... 11193986

(51) Int. Cl.
B32B 37/00 (2006.01)

(52) U.S. Cl.
USPC ........ 156/92; 29/402.17; 29/402.15; 29/34 B; 29/524.1; 29/428; 29/525.07; 29/525.11; 29/525.12; 29/795; 52/3; 52/4; 52/41; 52/42; 52/43

(58) Field of Classification Search
USPC ....... 156/92; 29/402.17, 402.15, 34 B, 524.1, 29/428, 525.07, 525.11, 525.12, 795; 52/3, 4, 41, 42, 43
See application file for complete search history.

(56) References Cited

U.S. PATENT DOCUMENTS

2008/0251196 A1 * 10/2008 Stumpf et al. ............. 156/275.5

* cited by examiner

*Primary Examiner* — Jeff Aftergut
*Assistant Examiner* — Jaeyun Lee
(74) *Attorney, Agent, or Firm* — Jordan IP Law, LLC; Todd A. Vaughn (57) ABSTRACT

A method for connecting a first component to a second component, the method including: applying a fastening dome composed of material in a viscous state to the first component, hardening the fastening dome on the first component, and then inserting a connecting element through the first component, second component, and at least partially through the fastening dome.

20 Claims, 6 Drawing Sheets

METHOD FOR CONNECTING A FIRST COMPONENT TO A SECOND COMPONENT

CROSS-REFERENCE TO RELATED APPLICATIONS

The present application claims priority under 35 U.S.C. §119 to European Patent Application No. 11193986.4 (filed on Dec. 16, 2011), which claims priority to U.S. Provisional Patent Application No. 61/536,277 (filed on Sep. 19, 2011), which are each hereby incorporated by reference in their respective entireties.

FIELD OF THE INVENTION

The present invention relates to a method for connecting a first component to a second component, such us, for example, motor vehicle shell components composed of a material such as plastic.

BACKGROUND OF THE INVENTION

Methods for connecting two components are sufficiently well known. For example, producing connections by adhesive bonding, riveting, nailing or with the use of screws is generally known. Particularly, in the case of the use of screws, particularly for sheet components, there is the problem of providing suitable surfaces for realizing an internal thread as a counterpart for the screw thread. For this purpose, in the known prior art, so-called screw domes or fastening domes are used, which can be formed on to a component, for example moulded with the component. Similar expedients and inserts can also be retroactively attached to the component, usually by adhesive bonding or welding. Both forming on and retroactive fastening of the known screw domes require elaborate process steps.

A fastening dome for a plastic carrier, which is formed on to the plastic carrier, is known from German Patent Publication DE 20 2008 009 055 U1. The fastening dome has a basic body, on which there are formed-on reinforcing ribs.

A method for producing a fastening arrangement of a fastening dome on a thin-walled component is known from German Patent Publication DE 10 2007 016 851 A1. In that case, one end of a fastening dome is realized as a joining portion. In addition, a joining portion that is matched to the joining portion of the fastening dome is formed on an inside of a component. The two joining portions are then wetted with adhesive, joined and fixedly connected to each other by light-hardening the plastic. This fastening dome joint is elaborate. The joining portions have to be exactly matched to each other, and the component has to be prepared to receive the fastening dome.

SUMMARY OF THE INVENTION

It is an object of the invention to provide enhanced methods for connecting a first component to a second component and, in particular, to specify a simple and inexpensive method that enables the components to be securely connected and that, at the same time, is also tolerant in respect to the surface condition of the components.

In accordance with embodiments of the invention, a method for connecting a first component to a second component includes at least one of the following steps: applying to the first component a fastening dome composed of a plastically deformable material that is in a viscous state; hardening the fastening dome on the first component; and then passing a connecting element through the second component, the first component and at least partially through the fastening dome.

In accordance with embodiments of the invention, a method for connecting a first component to a second component includes at least one of the following steps: inserting a material into a tool while the material is in a packaging; applying, using the tool, a fastening dome composed of the material in a viscous state to the first component; separating the material from the tool; removing at least a first part of the packaging and then removing a second part of the packaging; hardening the fastening dome on the first component; and then inserting a connecting element through the first component, second component, and at least partially through the fastening dome.

In accordance with embodiments of the invention, a method for connecting a first component to a second component includes at least one of the following steps: removing a material from an air-tight packaging; applying a fastening dome composed of the material in a viscous state to the first component; hardening the fastening dome on the first component; and then inserting a connecting element through the first component, second component, and at least partially through the fastening dome.

The two components are connected to each other by way of a mechanical connecting element such as, for example, a screw. In order to provide the connecting element with a good working surface, a fastening dome is first formed for the connecting element. The fastening dome, in this case, is realized retroactively on at least one of the two components. For this purpose, a hardenable material is used, which initially, in particular while being applied to the component, is soft and is easily plastically deformable. The material must not be liquid, since that would make it impossible to realize a dome. The material must have a certain stability of form, in order that the form of a dome, i.e., an elevation, can be realized and maintained until the material hardens, such that a holding surface corresponding to the connecting element, for example, a screw, can be offered, for example for a thread.

While being applied to the component, on the other hand, the material is sufficiently soft, viscous or gelatinous to enable it to adapt to the contours of the component. For example, the required consistency of a thermoplastic material is attained in its thermoplastic state of aggregation. As a result, the fastening dome can lie securely on the first component, the contact surface between a fastening dome and a first component is increased, and the condition is also created for a possible positive connection to a correspondingly realized surface of the first component. The fastening dome in accordance with the invention can therefore also be located on uneven surfaces, and positioning the dome does not require a high degree of accuracy.

The method in accordance with the invention can clearly also be used to connect more than two components. In addition to the first and the second component, there can be yet further components, which are penetrated by the same connecting element passed into the fastening dome, for example, between the first component and the second component, such that all components are connected to each other.

Preferably, the hardenable material is constituted such that it adheres by material bonding to the first component. It is thus advantageous by dispensing with the use of additional bonding means, such as adhesives.

Alternatively or additionally, however, a bonding means, in particular a bonding means effecting a material bond, can be used to securely fix the fastening dome to the first component. This can be, for example, an adhesive or a double-sided adhesive tape.

In a preferred embodiment, the hardenable material is made of plastic, in particular a thermoplastic material. Thermoplastic materials have the properties necessary for a fastening dome realized in accordance with the invention, and are easy to work.

The method in accordance with the invention can preferably be applied if the first component and/or the second component is/are composed of plastic.

The method in accordance with the invention for connecting two components preferably uses a mechanical device such as a screw as a connecting element. The screw can preferably have a head, so as to ensure that the connecting element is held in a secure, non-positive manner at the head end without further measures. The shank of the screw can be tapered, such that the screw can easily be screwed into a fastening dome that is not predrilled.

The first component and/or the second component is/are preferably predrilled at a position at which the two components are connected to each other. This makes it easier to pass the connecting element through the first and/or the second component. The fastening dome can easily be placed on the fastening hole provided.

In one embodiment of the method in accordance with the invention, the fastening dome is not predrilled at the time when the connecting element is inserted. With an appropriately selected hardenable material and/or appropriate time of insertion of the connecting element into the fastening dome, the material of the dome is sufficiently soft to be penetrated relatively easily by, for example, a thread-forming screw. It is not necessary for the connecting element to be inserted in the fastening dome at a precisely defined position.

Alternatively, the fastening dome can also be predrilled before the connecting element is passed through the fastening dome.

The hardenable material preferably hardens as a result of an exposure to air, as a result of temperature change, exposure to light, thus, for example, irradiation with UV light, or as the result of addition of an additive. The additive can be, for example, a hardening agent added, in small brittle balls, to a suitable plastic. When the plastic dome is applied to a component, the small balls can burst, in order thus to release the hardening agent. The hardenable material can therefore, be composed of a number of material components.

Before being applied to the first component, the hardenable material is preferably removed from an air-tight packaging, in particular, from a single packaging for just one fastening dome. The material is thus protected until it is used, and cannot harden prematurely, for example, in the case of air hardening.

In accordance with a preferred embodiment of the invention, the hardenable material is put into a tool, applied to the first component by way of the tool, then separated from the tool, and then hardens on the first component. The hardenable material is thus applied by way of the tool, thereby enabling the handling of the hardenable material to be simplified and facilitating industrial application of the method. The hardening of the material is effected, advantageously, after it has been separated from the tool, but it can also be effected, either partially or fully, while still connected to the tool.

Advantageously, the hardenable material is inserted in the tool while in a packaging, in particular in a single packaging for just one fastening dome and, before the hardenable material is applied to the first component, at least a first part of the packaging is removed. In accordance with this variant of the method, the packaging need not be opened in order to insert the hardenable material in the tool. It is only shortly before the material is applied to the component that at least a part of the packaging, for example a cover, is removed, such that the material can be placed directly on to the component and can adhere to the component. A further part of the packaging can still remain between hardenable material and the tool, for example as the material is being pressed on to the component, in order to facilitate the subsequent separation of the material and the tool.

In accordance with an embodiment of the invention, therefore, a second part of the packaging can be removed after the hardenable material has been applied to the first component. The second part of the packaging, for example, a film acting as a separator between the tool and the material, is removed after the tool has been drawn away from the component, such that the material can subsequently harden unimpeded.

In accordance with a further embodiment of the invention, the tool is designed to soften the hardenable material, at least portionally, before it is applied to the first component, for example, in that heat is delivered to the hardenable material by the tool. As a result, the fastening dome can better adapt to the contours of the component and can better adhere to the component and, under appropriate conditions, can also fuse together with the surface of the component.

BRIEF DESCRIPTION OF THE DRAWINGS

Advantageous refinements of the invention will emerge from the dependent claims. An exemplary embodiment of the invention will be discussed in principle below on the basis of the drawing, in which:

DETAILED DESCRIPTION OF EMBODIMENTS

Figure 1:
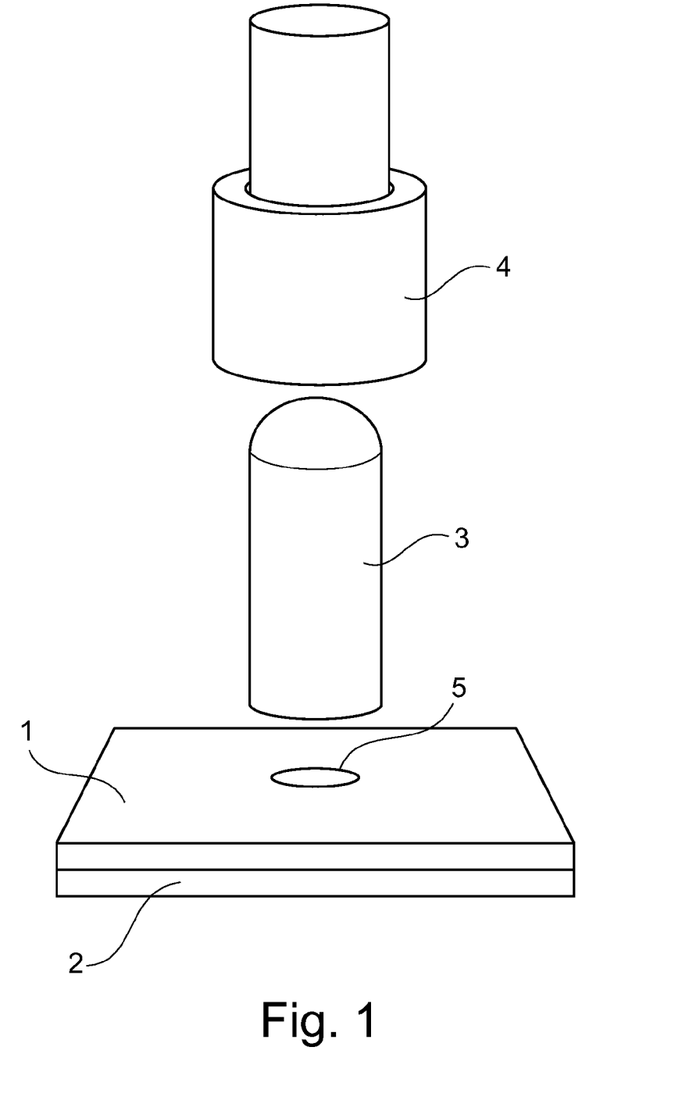
FIG. 1 illustrates a perspective view of components for executing a method in accordance with the invention.

As illustrated in FIG. 1, components of a method in accordance with the invention are represented three-dimensionally. A first component 1 is to be connected to a second component 2. Each component is illustrated in a generally rectangular cross section, embodiments, however, are not limited with respect thereto. The components 1, 2 can preferably be composed of a plastic material. For this purpose, a fastening dome 3 made of a hardenable material is used, for example, of thermoplastic material, which is applied to the first component 1. The fastening dome 3 in this case is placed on to a bore 5, which extends through the first component 1 and the second component 2. The bore 5 can be made with differing sizes in the components 1, 2, for example, on the one hand, in order to be sufficiently large in the second component 2 to facilitate the insertion of a connecting element and, on the other hand, sufficiently small in the first component 1 in order to afford the connecting element little play and to maintain a sufficient bearing contact surface for the fastening dome 3. The fastening dome 3 is placed on to the first component 1 by way of a tool 4.

Figure 2:
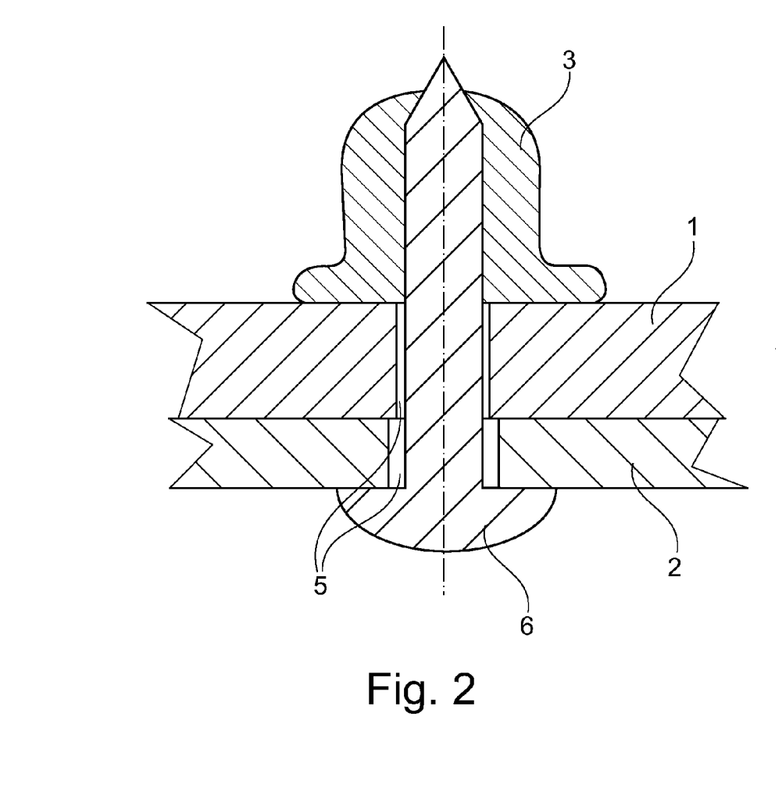
FIG. 2 illustrates a schematic sectional representation of components connected in accordance with the invention.

As illustrated in FIG. 2, a connection between the first component 1 and the second component 2 is provided, which connection has been effected by a method in accordance with the invention. The fastening dome 3 is placed spatially over the bore 5, on the first component 1. Serving as a connecting element 6 is a screw, which has a head that lies on the second component 2. In FIG. 2, the connecting element 6 extends through the bore 5 and penetrates the fastening dome 3, such that the tip of the screw is exposed outside of the fastening dome 3. Alternatively, the tip end of the connecting element 6 can also terminate inside the fastening dome 3.

Figure 3:
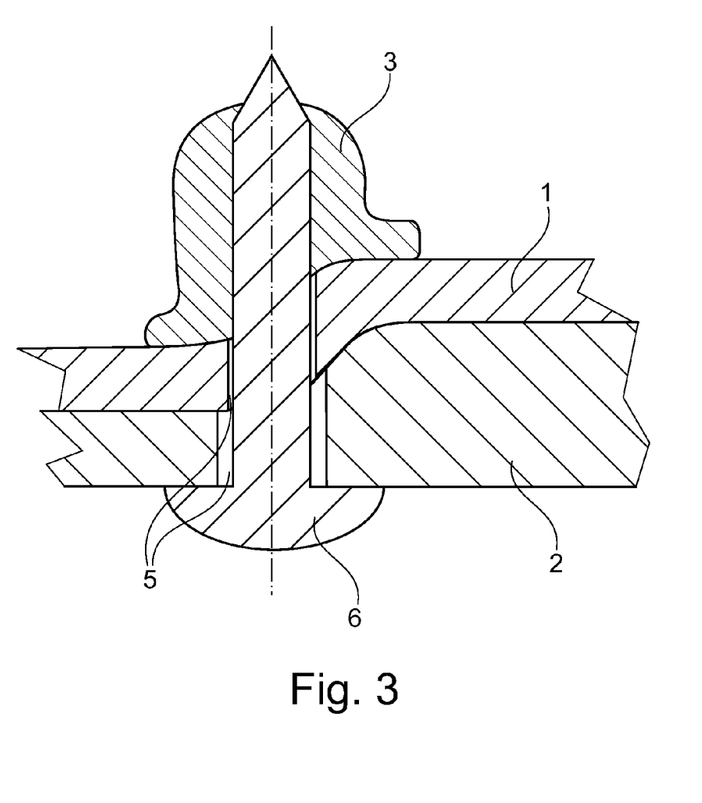
FIG. 3 illustrates another schematic sectional representation of components connected in accordance with the invention.
Figure 4:
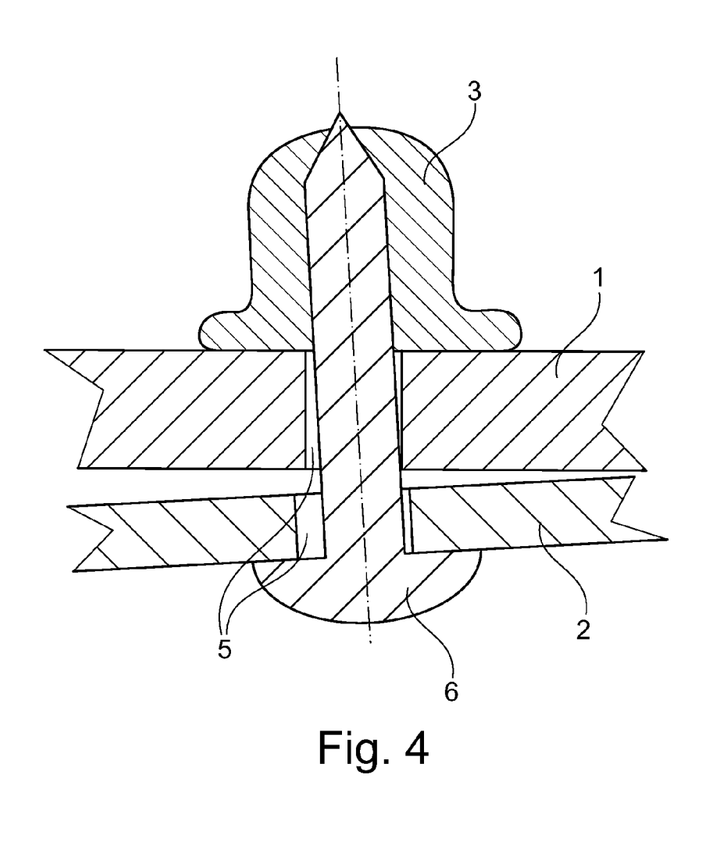
FIG. 4 illustrates an additional schematic sectional representation of components connected in accordance with the invention.
Figure 5:
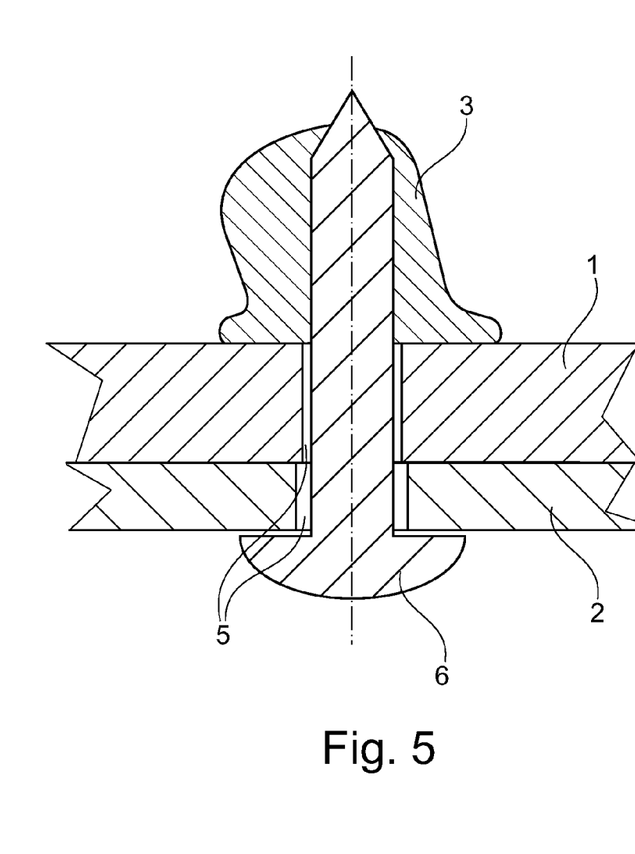
FIG. 5 illustrates a further schematic sectional representation of components connected in accordance with the invention.

FIGS. 3 to 5, in further schematic representations, illustrate that the method in accordance with the invention is particularly unaffected by large tolerances or inaccuracies of the components.

As illustrated in FIG. 3, for example, the fastening dome 3 is placed on an edge of the components 1, 2, such that the fastening dome 3 has differing heights along its circumference. This is made possible in that the initially soft material of the fastening dome 3 can adapt well to the contours of the surface of the first component 1. The method in accordance with the invention is suitable even if the components 1, 2 are not lying flatly on the surface with respect to each other, as represented in FIG. 4. Furthermore, a high degree of precision is not required for placing the fastening dome 3 itself, since, as represented in FIG. 5, even a fastening dome 3 sitting in a skewed or otherwise angled with respect to a vertical axis manner can offer sufficient hold for a connecting element 6.

Figure 6A:
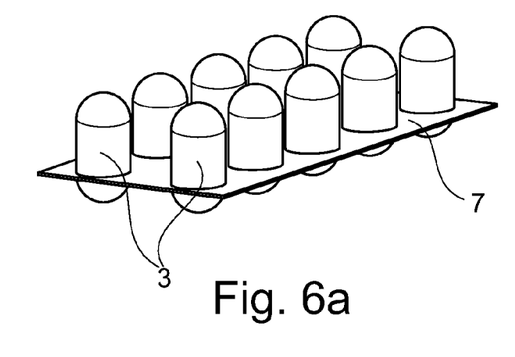
FIGS. 6a-6c illustrate respective 3D and section representations of fastening domes in their respective packagings.
Figure 6B:
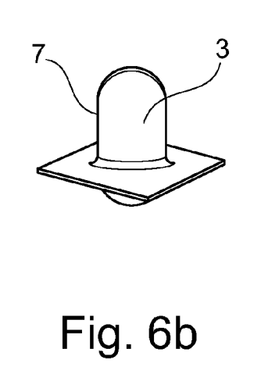
Figure 6C:
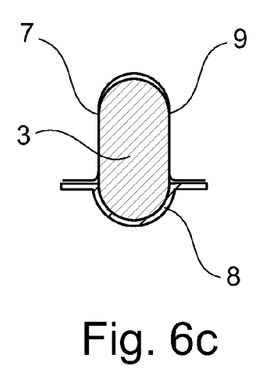

FIGS. 6a to 6c illustrate an advantageous manner of keeping the hardenable material for the fastening dome 3. FIG. 6a shows a packaging 7 for a plurality of fastening domes 3, which is similar to the known blister packagings. The individual fastening domes 3, with their individual packagings, or capsules, represented in FIG. 6b, are easy to separate from the rest of the individual packagings. As represented in FIG. 6c, a single packaging include a first part of the packaging 8, which corresponds to a cover that can be removed from the fastening dome 3 without removing the rest of the packaging 7, namely, the second part of the packaging 9.

Individual steps of a method in accordance with the invention are represented in FIGS. 7a to 7f.

Figure 7A:
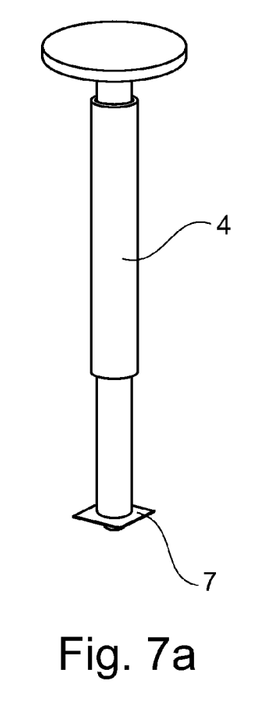
FIGS. 7a-7f illustrate respective representations of method steps in accordance with the invention.

As illustrated in FIG. 7a, a fastening dome is first inserted, in its individual packaging 7, into the tool 4.

Figure 7B:
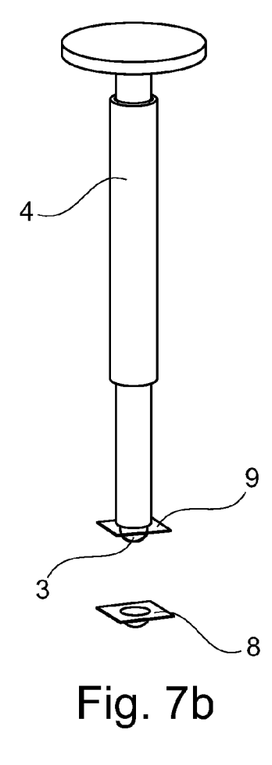

As illustrated in FIG. 7b, the first part of the packaging 8 is then drawn off the fastening dome 3.

Figure 7C:
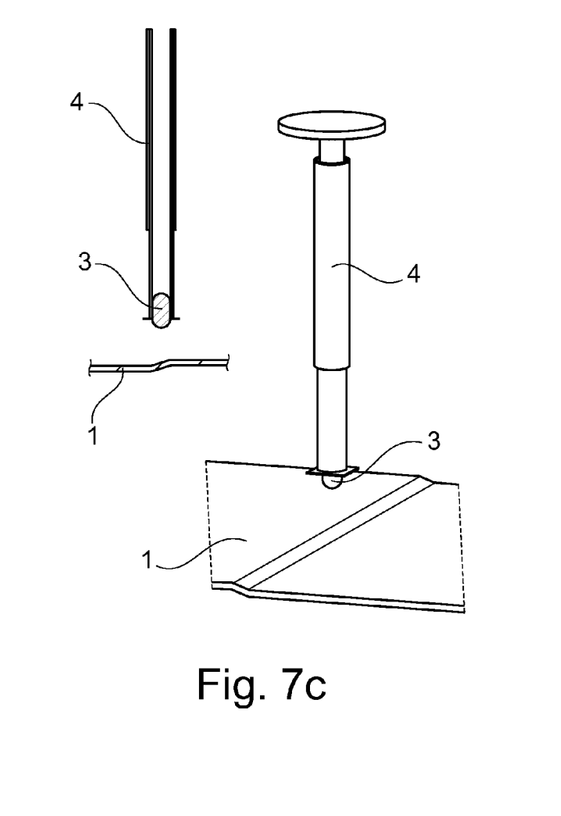
Figure 7D:
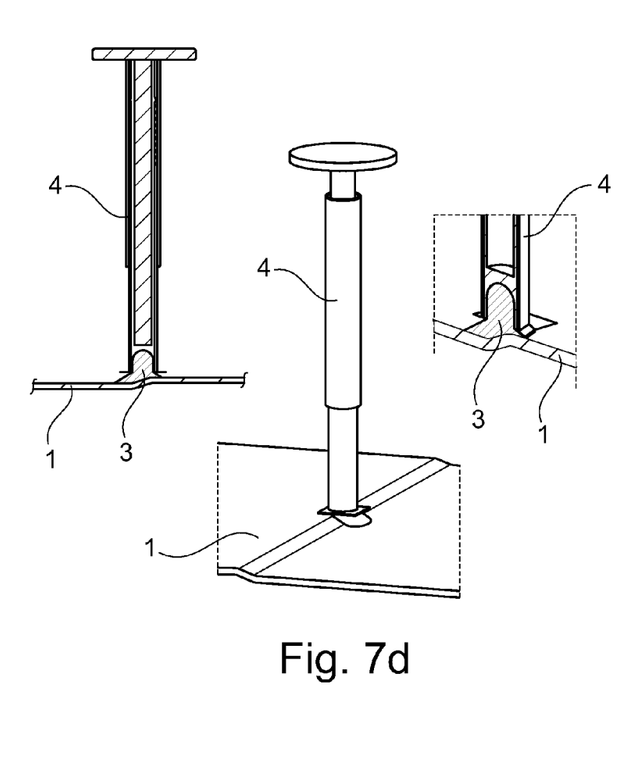

As illustrated in FIGS. 7c and 7d, finally, the hardenable mass of the fastening dome 3 is pressed on to the first component 1, the component 1 having an edge at the intended connection point in the example illustrated. In addition to the three-dimensional representation, FIGS. 7c and 7d also illustrate a sectional representation of the position of the hardenable material of the fastening dome 3 in the tool 4. In FIG. 7d, the still soft mass of the fastening dome 3 that has been placed adapts to the contour of the edge of the first component 1.

Figure 7E:
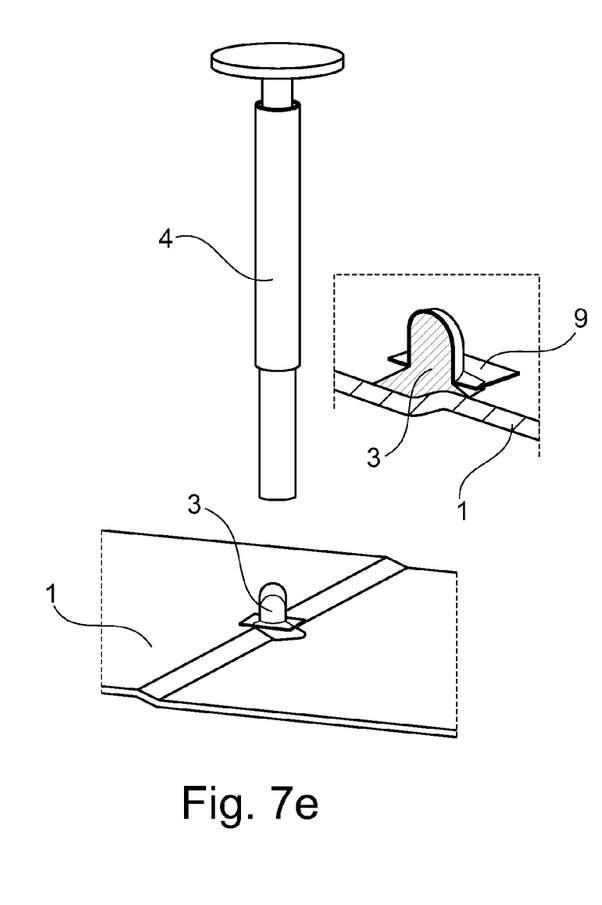

As illustrated in FIG. 7e, finally, the tool 4 is drawn away from the first component 1 and from the fastening dome 3.

Figure 7F:
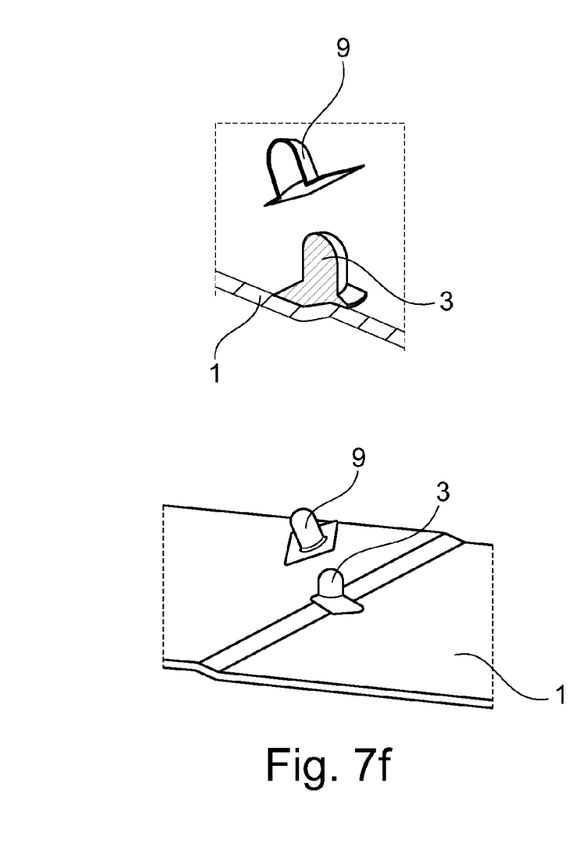

As illustrated in FIG. 7f, the remaining second part of the packaging 9 is then drawn off the fastening dome 3. The material of the fastening dome 3 ultimately hardens, and can be used as a fastening dome, for example, for a screw, for connecting components.

Embodiments of the invention thus represents a particularly simple and inexpensive method that enables the components to be securely connected and, at the same time, is also tolerant in respect of the surface condition of the components.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE NUMERALS

1 first component
2 second component
3 fastening dome
4 tool
5 bore
6 connecting element
7 packaging
8 first part of the packaging
9 second part of the packaging

What is claimed is:

1. A method for connecting a first component to a second component, the method comprising:
   inserting a material into a tool while the material is in a packaging;
   applying, using the tool, a fastening dome composed of the material in a viscous state to the first component;
   separating the material from the tool;
   removing at least a first part of the packaging and then removing a second part of the packaging;
   hardening the fastening dome on the first component; and then
   inserting a connecting element through the first component, second component, and at least partially through the fastening dome.

2. The method of claim 1, wherein, before applying the fastening dome to the first component, softening the material using the tool, at least portionally.

3. A method for connecting a first component to a second component, the method comprising:
   removing a material from an air-tight packaging;
   applying a fastening dome composed of the material in a viscous state to the first component;
   hardening the fastening dome on the first component; and then
   inserting a connecting element through the first component, second component, and at least partially through the fastening dome.

4. A method for connecting a first component to a second component, the method comprising:
   applying a fastening dome composed of material in a viscous state to the first component;
   hardening the fastening dome on the first component; and then
   inserting a connecting element through the first component, second component, and at least partially through the fastening dome.

5. The method of claim 4, wherein the material adheres by material bonding to the first component.

6. The method of claim 4, wherein the material comprises a plastic.

7. The method of claim 4, wherein the material comprises a thermoplastic material.

8. The method of claim 4, wherein at least one of the first component and the second component is composed of plastic.

9. The method of claim 4, wherein the connecting element comprises a screw.

10. The method of claim 4, wherein at least one of the first component and the second component has a bore at a region in which the first components and the second component are connected to each other.

11. The method of claim 4, wherein the fastening dome is not predrilled at the time when the connecting element is inserted.

12. The method of claim 4, wherein the material hardens as a result of at least one of exposure to air, a change in temperature, an exposure to light, and through an addition of an additive.

13. The method of claim 4, comprising, before applying the fastening dome to the first component, the material is removed from an air-tight packaging.

14. The method of claim 13, wherein the material is removed from a single packaging for a single fastening dome.

15. The method of claim 4, comprising, before applying the fastening dome to the first component, placing the material into a tool.

16. The method of claim 15, wherein, before hardening on the first component, the fastening dome is applied to the first component via the tool, then separated from the tool.

17. The method of claim 4, comprising, before applying the fastening dome to the first component, inserting the material in the tool while in a packaging.

18. The method of claim 17, wherein, before hardening on the first component, removing at least a first part of the packaging.

19. The method of claim 18, wherein, after applying the material to the first component, a second part of the packaging is removed.

20. The method of claim 13, wherein, before applying the fastening dome to the first component, softening the material using the tool, at least portionally.

* * * * *